United States Patent [19]
Wolf

[11] Patent Number: 5,648,607
[45] Date of Patent: Jul. 15, 1997

[54] REPLACEABLE SIGHT GAUGE SYSTEM

[75] Inventor: Mike Wolf, Hamshire, Ill.

[73] Assignee: Vescor Corporation, South Elgin, Ill.

[21] Appl. No.: 316,025

[22] Filed: Sep. 30, 1994

[51] Int. Cl.$^6$ .................................................. G01F 23/02
[52] U.S. Cl. .................................................. 73/332; 73/328
[58] Field of Search .............................. 73/328, 329, 332, 73/333, 323, 326

[56] References Cited

U.S. PATENT DOCUMENTS

| | | | |
|---|---|---|---|
| 319,052 | 6/1885 | Bailey et al. | 73/333 |
| 2,929,401 | 3/1960 | Cowan | 137/540 |
| 3,479,874 | 11/1969 | Lukas et al. | 73/332 |

FOREIGN PATENT DOCUMENTS

| | | | |
|---|---|---|---|
| 452214 | 5/1968 | Switzerland | 73/333 |
| 886807 | 1/1962 | United Kingdom . | |

Primary Examiner—William A. Cuchlinski, Jr.
Assistant Examiner—Willie Morris Worth
Attorney, Agent, or Firm—McAndrews, Held & Malloy, Ltd.

[57] ABSTRACT

The present invention relates to a replaceable sight gauge system to monitor fluid levels in a reservoir or fluid tank. The sight gauge of the present system is mounted to the wall of a fluid tank by two bolt assemblies. The bolt assemblies, which include an entry bolt, an exit bolt, and a fastener, are designed to selectively allow fluid from the tank to flow through the bolt assembly into the sight gauge while holding the sight gauge securely against the fluid tank. The entry bolt houses a valve which opens when the exit bolt is mated with the entry bolt. When the exit bolt is disengaged from the entry bolt, the valve moves back to a closed position so that fluid cannot escape from the fluid tank. The sight gauge can easily be replaced from the disengaged exit bolt.

16 Claims, 5 Drawing Sheets

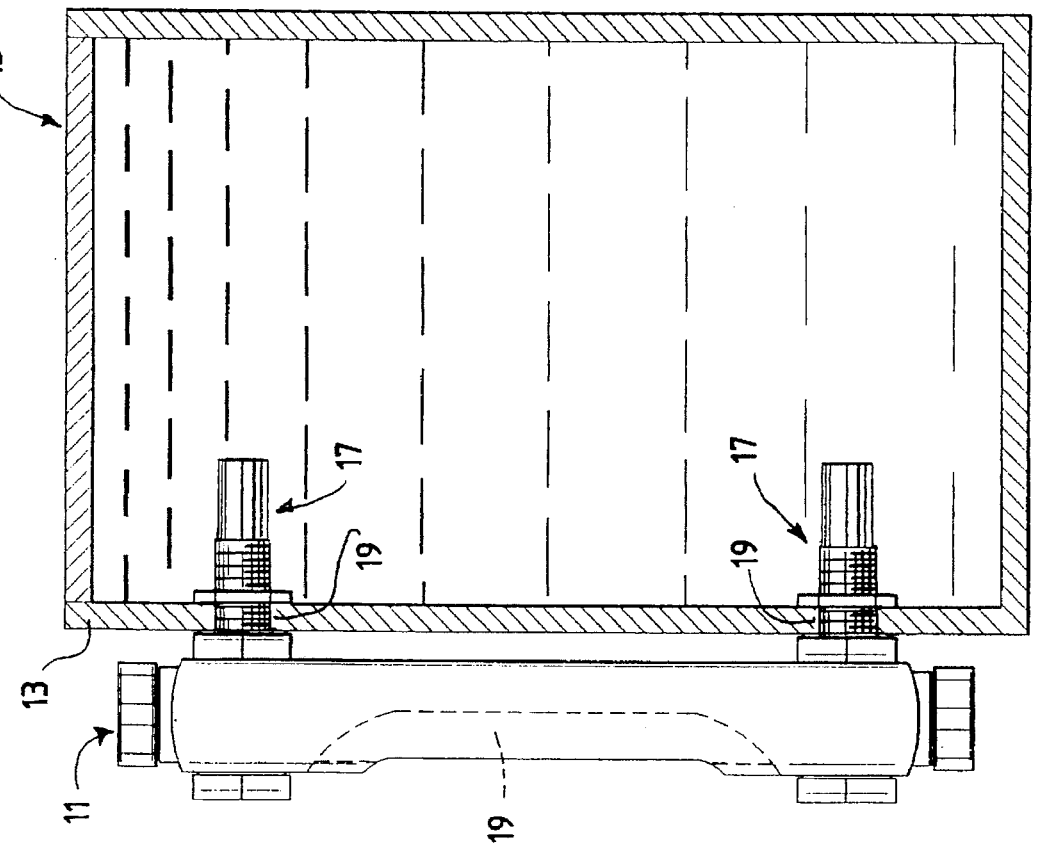
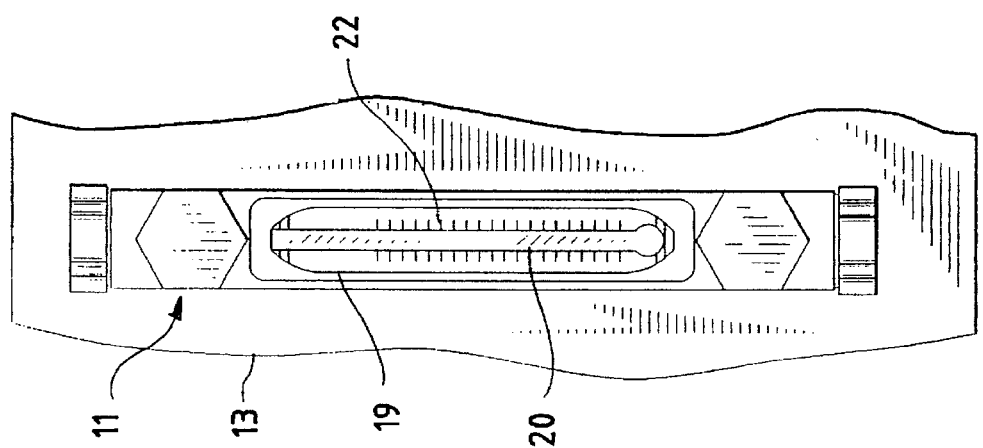

5,648,607

REPLACEABLE SIGHT GAUGE SYSTEM

BACKGROUND OF THE INVENTION

The present invention relates to a replaceable sight gauge for use with a reservoir, and more particularly to an apparatus for permitting replacement of a sight gauge without draining the reservoir prior to replacement.

Sight gauges are typically used to check fluid levels in reservoirs, and may be used to monitor the temperature, pressure, or virtually any property or characteristic of the fluid within the reservoir. If a sight gauge is in need of replacement, the reservoir must first be drained of the fluid. The sight gauge is then removed, a new sight gauge mounted to the reservoir, and then the fluid is replaced in the reservoir.

It is an object of the present invention to provide a sight gauge which can be removed and replaced without draining the reservoir to which it is attached.

Another object of the present invention is to provide an apparatus capable of shutting off fluid flow from a reservoir with minimal fluid spillage.

Yet another object of the present invention is to provide a low cost, easy to install replaceable sight gauge system.

SUMMARY OF THE INVENTION

These and other objects of the invention are achieved in a replaceable sight gauge system featuring a sight gauge which can be removed and replaced from a fluid tank or reservoir with minimal spillage, without draining or disturbing the fluid in the tank. The sight gauge of the present system is mounted to the wall of a reservoir or fluid tank by two bolt assemblies. Each bolt assembly comprise an entry bolt, an exit bolt and a fastener. The body of the entry bolt passes through an aperture in the wall of the fluid tank such that the head of the entry bolt abuts the exterior of the fluid tank while the body of the entry bolt projects into the fluid tank. The fastener secures the entry bolt to the wall. The head of the exit bolt abuts the front of the sight gauge while the body of the exit bolt passes through an opening in the sight gauge and mates with the interior of the entry bolt such that the sight gauge is secured to the fluid tank wall.

The bolt assemblies are designed to selectively allow fluid from the tank to flow through the entry and exit bolts to a fluid container in the gauge, where the fluid level can be measured and monitored. Each entry bolt houses a valve assembly comprising a valve seat and a valve cover biased against the valve seat to a closed position. When the exit bolt mates with the entry bolt, the valve cover is pushed away from the valve seat to an open position to allow fluid flow.

In a preferred embodiment, the valve assembly includes a valve seat formed by a ridge on the interior of the entry bolt surrounded with a rubber O-ring for sealing, a steel ball valve cover, and a spring to bias the ball against the ridge. The spring is held in place by an internal clip ring. The valve assembly is in a resting position when it is closed, i.e. when the exit bolt is not mated with the entry bolt. To open the valve, the exit bolt mates with the entry bolt, a ram member on the distal end of the body of the exit bolt pushes the steel ball off the ridge, causing the spring to compress against the clip ring. When the steel ball is pushed off the ridge, an opening for fluid flow is exposed. A stop adjacent the clip ring prevents the exit bolt from damaging the valve seat.

BRIEF DESCRIPTION OF THE DRAWINGS

FIG. 1(A) shows a front view of an embodiment of the replaceable sight gauge system according to the present invention.

FIG. 1(B) shows a side view of the replaceable sight gauge system of FIG. 1A.

DETAILED DESCRIPTION OF THE PREFERRED EMBODIMENT

Figure 2:
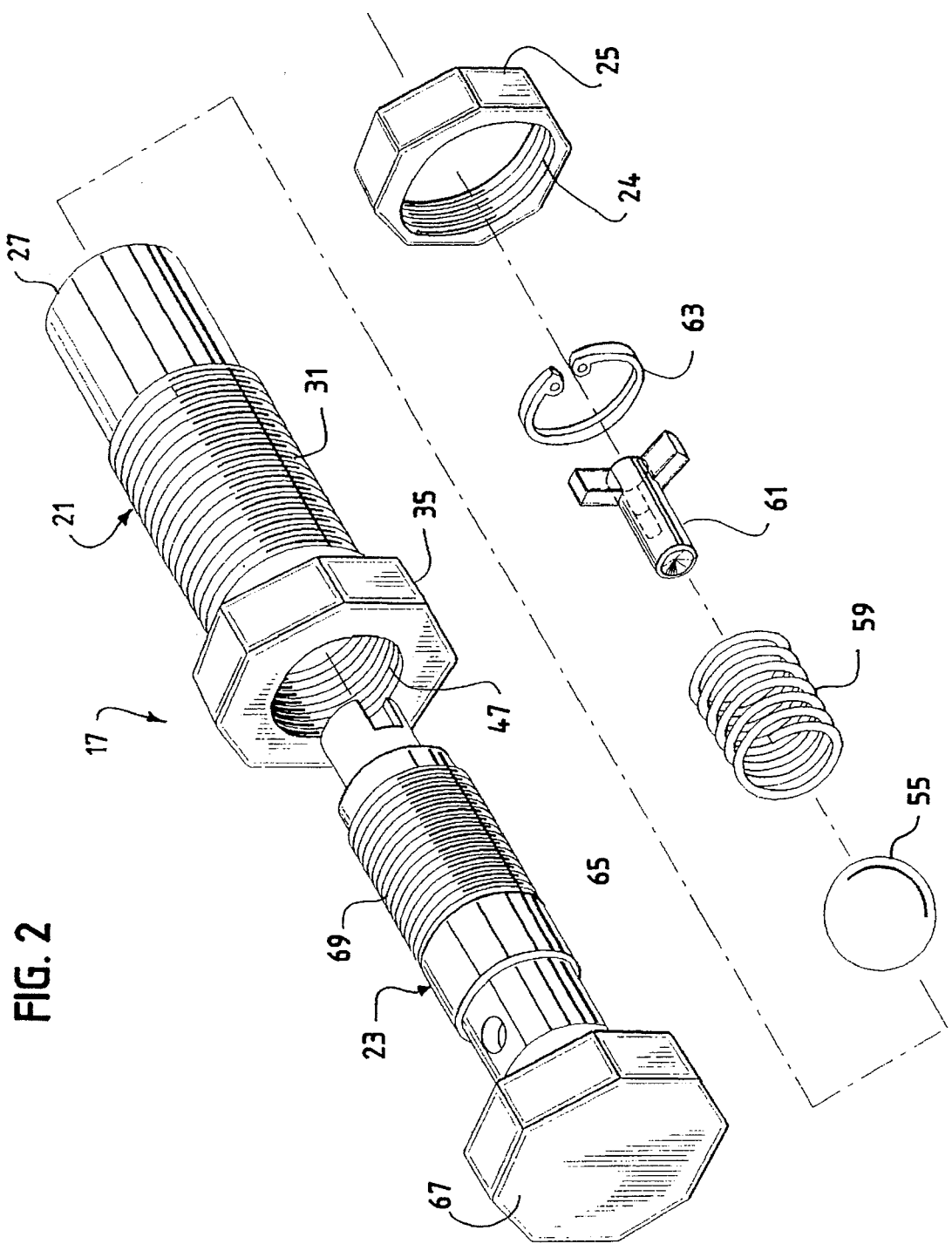
FIG. 2 is an exploded view of a bolt assembly of the replaceable sight gauge system of FIG. 1.

Referring to FIGS. 1(A) and 1(B), a replaceable sight gauge 11 is mounted securely to the front wall 13 of a fluid tank 15. A pair of bolt assemblies 17 serve to hold sight gauge 11 securely in place via a pair of aperture 19 formed in the tank wall. Sight gauge 11 may be installed to an existing reservoir by the formation of two mounting apertures 19 of proper diameter and spacing therebetween.

Sight gauge 11 is defined as any instrument having a passageway which is to communicate with the interior of a tank or reservoir. The gauge 11 responds to a characteristic of the fluid within the tank (e.g., fluid level, temperature, pressure, etc.) for generating an output of information regarding the characteristic being monitored. For example, in the embodiment of gauge 11 in FIG. 1, a transparent fluid container 19 is provided for permitting visual inspection of the fluid level within the tank 15. A thermometer glass 20 is mounted within the transparent fluid container to visually indicate the temperature of the fluid in tank 15. A metal strip 22 is positioned behind the thermometer 20 and carries indicia representing temperature degree values.

Referring to FIG. 2, each bolt assembly 17 is identical, and includes an entry bolt 21, an exit bolt 23, and a threaded nut member 25. Entry bolt 21 is formed of a bolt body 27 which is generally cylindrical in shape and terminating at its distal end in a bolt head 35.

Figure 3:
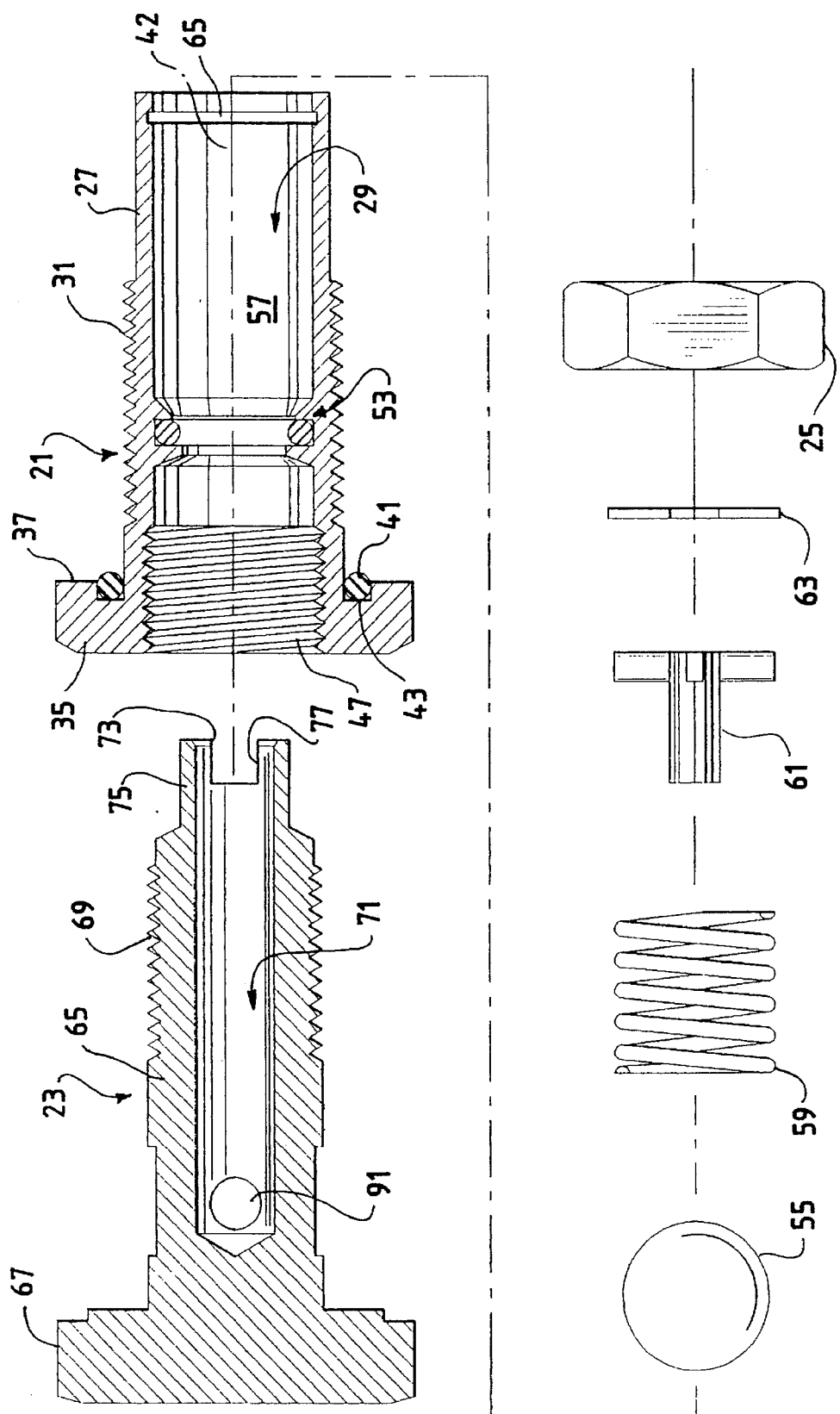
FIG. 3 shows a cross sectional side view and a side view of component parts of the bolt assembly of FIG. 2.

As shown in FIG. 3, a passageway 29 passes completely through bolt body 27. A plurality of threads 31 are formed on the outer surface of body 27 and are centrally located, as shown. The threads 31 are of a size for mating with threads 24 (FIG. 2) on the inside surface of nut member 25. Bolt head 35 has an outer octagonally shaped surface for mating with a conventional wrench to facilitate rotational movement or bias to body 27.

Figure 4:
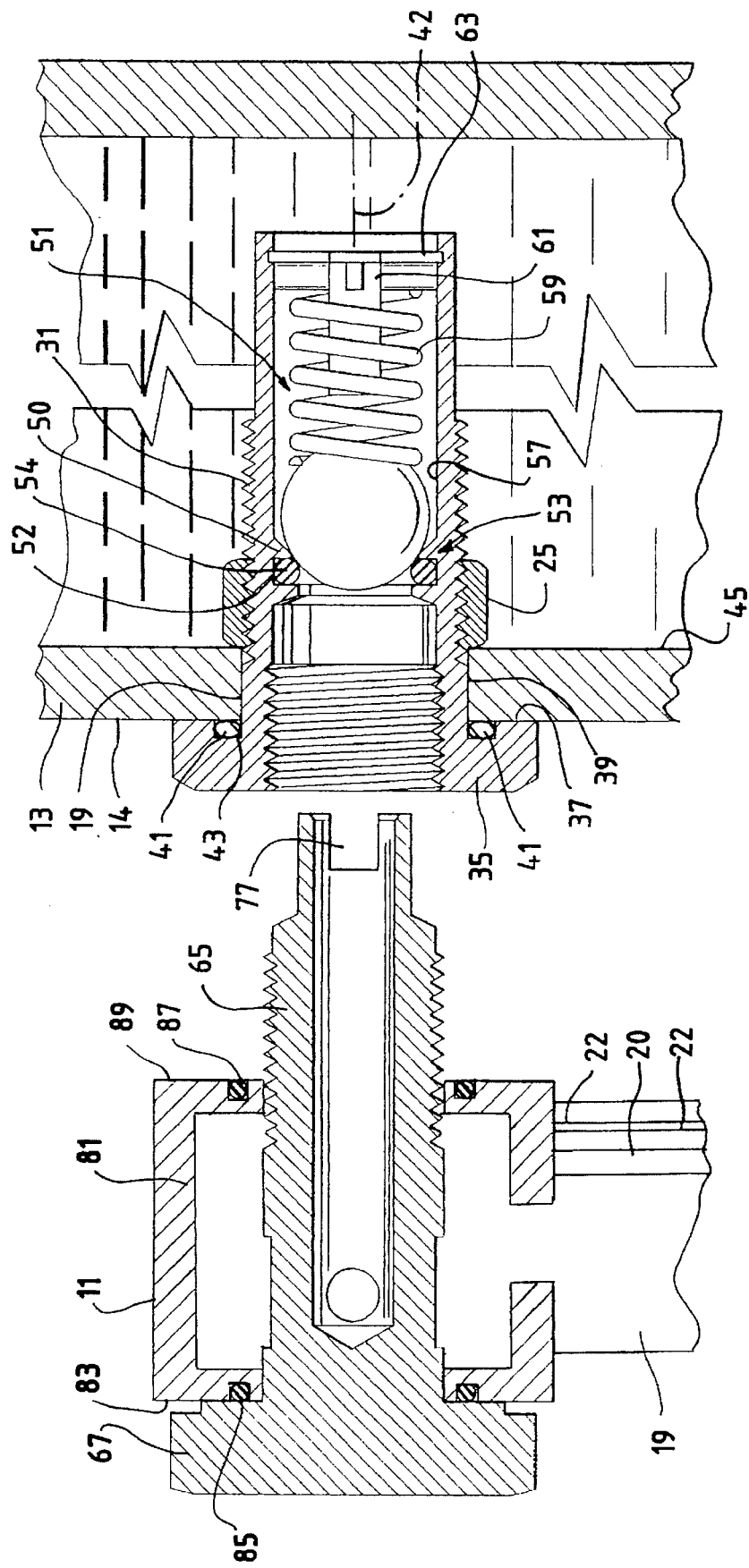
FIG. 4 shows a cross sectional side view of the assembled but disengaged component parts of the bolt system of FIG. 2, the lower portion of the gauge is not shown except for a portion of several internal components.

As shown in FIG. 3, bolt head 35 has an outer diameter greater than that of threads 31 to provide a flat axially-facing abutment surface 37. The diameter of the remaining portion of bolt body 27 is of a size for passing through aperture 19 formed in tank wall 13, as best seen in FIG. 4. The diameter of aperture 19 is slightly larger than the diameter of an outer surface 39 of the body 27, adjacent bolt head 35, for providing a close fit between outer surface 39 and the tank wall aperture 19.

Entry bolt 21 is of a length such that at least part of the body of the entry bolt, including a portion of threads 31, extends through wall 13 and is exposed within tank 15. Bolt head 35 is larger in size than aperture 19 such that abutment surface 37 of the bolt head abuts the outer surface 14 of tank wall 13 when entry bolt 21 is properly installed. A sealing member 41 is placed between tank wall 13 and the entry bolt head 35 to prevent fluid seepage from the aperture. Sealing member 41 may be a rubber O-ring or any other sealing element and is placed within an annular channel 43 formed in bolt head 35 concentric with the central axis 42 (FIG. 3) of bolt body 27.

Referring to FIG. 4, threaded nut member 25 mates with threads 31 of entry bolt body 27 after the entry bolt passes into the tank. Nut member 25 is screwed tight against the inside surface 45 of tank wall 13 pulling bolt head abutment surface 37 tight against the outer surface 14 of the tank. Nut member 25 thus fixes entry bolt 21 into position relative to the tank wall 13.

Referring again to FIG. 3, passageway 29 is formed from an inside surface 57. Internal threads 47 are formed on inside surface 57 at the proximal end of entry bolt 21. In addition, entry bolt 21 houses a valve assembly 51 (shown assembled in FIG. 4) which is in a closed position or an open position in accordance with actuation by exit bolt 23, as described hereinafter. Valve assembly 51 comprises a valve seat 53 and a valve cover 55 which is biased to a closed position against valve seat 53. Valve cover 55 is formed of a steel spherical ball. Valve seat 53 is formed from a conical ridge 50 disposed concentric with body axis 42 on interior surface 57 of entry bolt 21. An annular groove 52 is formed proximally adjacent to ridge 50 for receiving a rubber O-ring 54. O-ring 54 has a diameter sufficient to extend within passageway 29 and make sealing contact with ball 55 when ball 55 rests against ridge 50. Ridge 50 is formed integral to and as a portion of the bolt body 27.

A spring 59 is located distally adjacent ball 55 and biases ball 55 against ridge 50. Spring 59 and ball 55 are retained within the entry bolt passageway by a stop member 61 and a retaining ring 63. Ring 63 is mounted in an annular groove 65 (FIG. 3) formed in inside surface 57 at the distal end of the entry bolt 21. Retaining ring 63 is a metal clip ring, as shown in FIG. 2. Clip ring 63 serves to block the stop 61 from sliding distally out from passageway 29.

Stop 61 prevents damage to the valve assembly, by preventing the exit bolt 23 from being forced too far into the entry bolt 21. Stop 61 is shaped to allow fluid to flow into and through the passageway 29 while having a structure capable of withstanding force exerted by the exit bolt 23 during operation of the valve assembly. The elements making up the valve assembly are shown dismantled in FIGS. 2 and 3, while FIG. 4 shows the fully constructed valve assembly.

Referring again to FIG. 2, exit bolt 23 is formed of a bolt body 65 which is generally cylindrical in shape and terminating in a bolt head 67. Exit bolt 23 is sized and shaped such that its body 65 may be mated with the body of the entry bolt 21. The body of the exit bolt 23 includes a threaded exterior surface 69 mateable with the threaded interior surface 47 of the entry bolt 21.

As shown in FIG. 3, a second fluid passageway 71 is defined in the interior of the exit bolt 23. Fluid passageway 71 has an opening 73 at the distal end of the exit bolt 23 and continues to the proximal end of the exit bolt but stops short of head 67. The second fluid passageway 71 is preferably axially symmetric relative to the exterior threaded surface 69 of the exit bolt.

A ram member 75 is formed at the distal end of exit bolt 23. Ram member 75 has a cylindrical configuration sized to pass through valve seat 53 formed in the interior of entry bolt 21. Ram member 75 includes a pair of identical side apertures 77 which allow fluid to flow from the first fluid passageway 29 into the second fluid passageway 71.

To use the replaceable sight gauge system as shown in FIGS. 1(A) and 1(B), entry bolt 21 is secured to wall 13 of fluid tank 15 using nut member 25 as described above. The valve assembly located within the entry bolt is in a closed position, as shown in FIG. 4, such that fluid from the tank 15 will not spill out through passageway 29.

Before attaching the sight gauge to the tank, exit bolt 23 is passed through an entry passageway 81 (FIG. 4) in the sight gauge 11. Entry passageway 81 has cylindrical openings and defines a passageway from the front side 83 to the back side 89 of gauge 11. Head 67 of exit bolt 23 abuts the front side 83 of sight gauge 11 while bolt body 65 extends through the sight gauge and is threadably engaged within the interior of entry bolt 21. Sealing members 85, 87 formed of rubber O-rings are placed between the head of the exit bolt and the front side of the sight gauge, and between the back side 89 of the sight gauge and the head 35 of the entry bolt to form a spill-proof seal between the bolt assembly and the sight gauge after the sight gauge is secured to the tank. The exit bolt 23 is threaded into the entry bolt 21 until sight gauge 11 is mounted securely to the tank wall 13.

Figure 5:
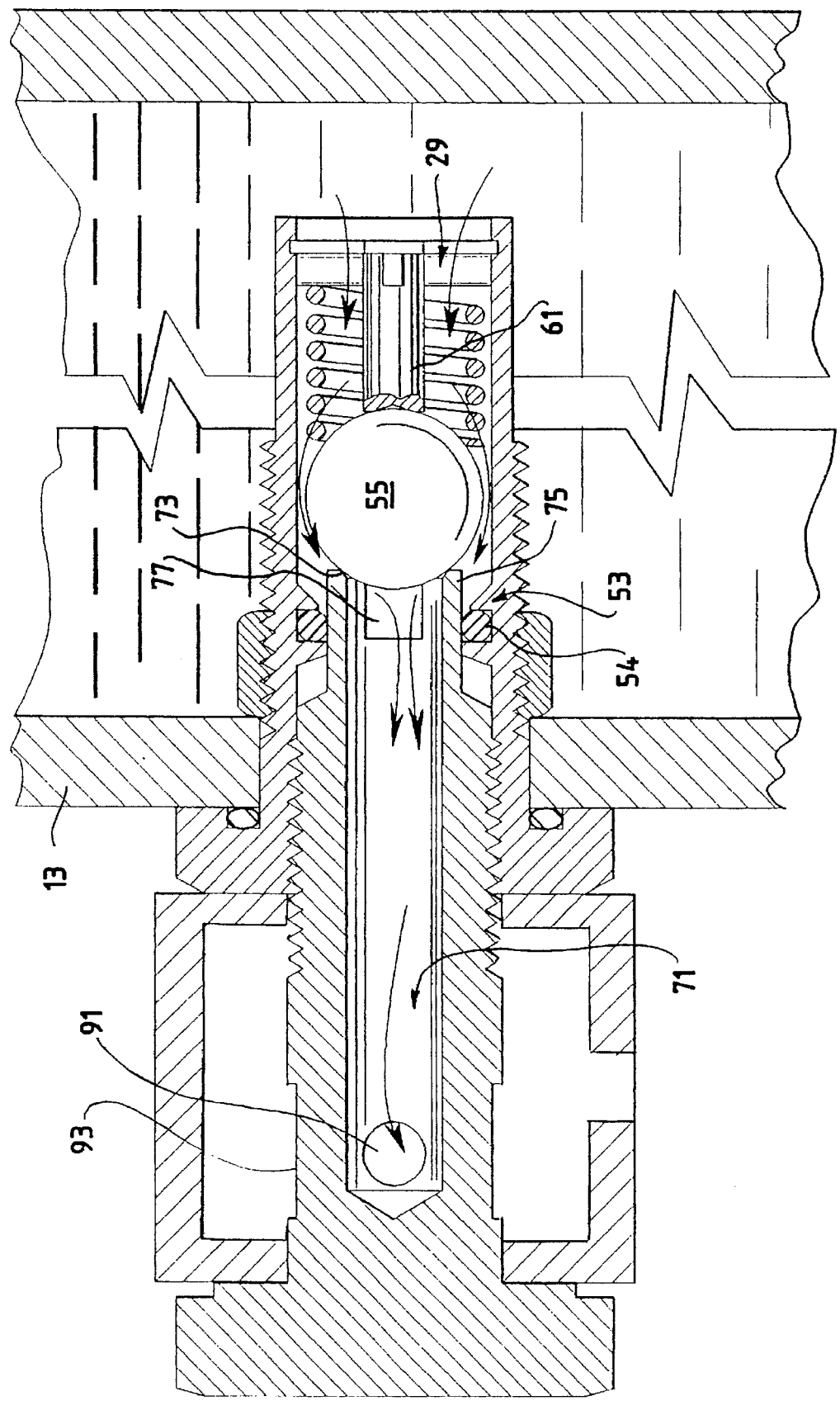
FIG. 5 shows a cross sectional side view of the assembled and engaged component parts of the bolt system of FIG. 2.

As shown in FIG. 5, the valve assembly opens as the exit bolt 23 mates with entry bolt 21. Ram member 75 pushes the valve cover 55 off of the valve seat 53, thus allowing fluid from the first fluid passageway 29 to enter into the second fluid passageway 71 through aperture 77 in ram member 75. Steel ball 55 seats against and closes the terminal opening 73 of the passageway 71 and thus aperture 77 controls the flow of fluid into passageway 71. Fluid flowing in the second fluid passageway 71 exits through a radial opening 91 which leads into an annular cylindrical fluid passageway 93. From fluid passageway 93, fluid flows to a fluid container 19 (FIG. 4), where the fluid level and temperature of the fluid may be monitored.

As shown in FIG. 5, sealing member 54 of the valve provides a seal between the valve seat 53 and the outer surface of ram 75. The stop 61 prevents the exit bolt from being forced into the entry bolt past a certain desired position by preventing the valve cover 55 from exiting the first fluid passageway 25. The spring 59 remains in a compressed position while the exit bolt is fully threaded within the entry bolt.

To replace the gauge, the exit bolt is unthreaded from the entry bolt. As the exit bolt retreats from the entry bolt, the spring 59 expands, pushing the valve cover 55 toward the valve seat 53. After the ram member 75 on the distal end of the exit bolt passes the position where the valve seat 53 is located, the valve cover 55 is once again biased against the valve seat 53, closing the valve. Once the exit bolt is fully disengaged from the entry bolt 11, the gauge can easily be replaced.

What is claimed is:

1. A replaceable sight gauge system comprising:
   a fluid tank defined by a tank wall, said tank wall having at least one aperture to permit fluid to exit from said fluid tank;
   a display gauge having:
   (i) a front side;
   (ii) a back side;
   (iii) an entry passageway passing through said front side to said back side; and
   (iv) a fluid container communicating with said entry passageway for receiving a fluid flowing from said entry passageway;
   an entry bolt of a size for passing through said aperture formed in said tank wall, said entry bolt having:
   (i) a first bolt head disposed at a proximal end of said entry bolt and sized for abutting the outside surface of said tank wall;

(ii) a first fluid passageway extending axially through the entry bolt to permit fluid flow between the exterior and interior of the tank; and (iii) a valve located in said first fluid passageway for controlling fluid flow therethrough, said valve including a valve seat and a moveable valve cover, said valve cover is movable against said seat to a closed position to prevent fluid flow through said first fluid passageway;

a fastening member securing said entry bolt into a fixed position relative to said tank wall; and an exit bolt mateable with said entry bolt and sized to pass through said gauge via said entry passageway, said exit bolt being of a length for exposing a proximal end of said exit bolt when it is mated with said entry bolt, said exit bolt having:

(i) a second bolt head sized for abutting the front side of said gauge for securing said gauge between said first and second bolt heads as said exit bolt is mated with said entry bolt;

(ii) a ram member formed at the distal end of said exit bolt and located for engaging said valve cover to open said valve when said exit bolt is mated with said entry bolt to hold said gauge between said first and second bolt heads; and (iii) a second fluid passageway formed in the interior of said exit bolt and extending between first and second openings, the first opening being formed in said ram member for allowing fluid to flow from said first fluid passageway to said second fluid passageway, and the second opening communicating between the fluid container and the second fluid passageway.

2. The apparatus of claim 1, wherein said second bolt head has a flat surface abutting said front side of said gauge.

3. The apparatus of claim 1, wherein a sealing member is positioned between said second bolt head and said front side of said gauge.

4. The apparatus of claim 1, wherein said first bolt head has a flat surface abutting said back side of said gauge.

5. The apparatus of claim 1, wherein a sealing member is positioned between said first bolt head and said back side of said gauge.

6. The apparatus of claim 1, wherein said gauge includes shoulders for mating with said second bolt head and said first bolt head.

7. An apparatus for attachment to an aperture in the wall of a fluid tank to permit selective blocking of fluid flow from the tank, comprising:

an entry bolt of a size for passing through the aperture in the tank wall, said entry bolt having:

(i) a first bolt head disposed at a proximal end of said entry bolt and sized for abutting the outside surface of the tank wall;

(ii) a first fluid passageway extending axially through the entry bolt to permit fluid flow between the exterior and interior of the tank; and (iii) a valve located in said first fluid passageway for controlling fluid flow therethrough, said valve including a valve seat and a moveable valve cover, said valve cover is movable against said seat to a closed position to prevent fluid flow through said first fluid passageway;

a fastening member securing said entry bolt into a fixed position relative to the tank wall; and an exit bolt mateable with said entry bolt and having:

(i) a ram member formed at the distal end of said exit bolt and located for engaging said valve cover to open said valve when said exit bolt is mated with said entry bolt (ii) a second fluid passageway formed in the interior of said exit bolt and extending between first and second openings, the first opening being formed in said ram member for allowing fluid to flow from said first fluid passageway to said second fluid passageway and the second opening being formed at a proximal end of the exit bolt to permit fluid to flow from the second fluid passage to the exterior of the tank.

8. The apparatus of claim 7, wherein the second opening is a radial flow passage formed at said proximal end of said exit bolt, said radial flow passage communicating with said second fluid passageway.

9. The apparatus of claims 7, wherein a sealing member is positioned between said first bolt head and said outside surface of said tank wall.

10. The apparatus of claim 7, wherein said second fluid passageway is axially symmetric relative to the outer surface of said exit bolt.

11. The apparatus of claim 7, wherein said second fluid passageway has an entrance defined by said first opening in said ram member, said first fluid passageway being wider than said entrance.

12. The apparatus of claim 7, wherein said valve seat includes a sealing member to engage the outer surface of said ram member.

13. The apparatus of claim 12, wherein said valve seat includes two beveled members and wherein said sealing member is gripped between said beveled members.

14. The apparatus of claim 7, wherein said valve cover is a spheroid positioned within said first fluid passageway.

15. The apparatus of claim 7, wherein said entry bolt includes a spring, and wherein said valve cover is biased against said seat by said spring.

16. The apparatus of claim 7, wherein said entry bolt includes a stop, said stop preventing said valve cover from exiting said first fluid passageway; a retaining ring retaining said stop within said first fluid passageway; and an annular groove formed on the distal end of said entry bolt, said retaining ring being mounted in said groove.

* * * * *